United States Patent [19]
Farris

[11] 3,831,790
[45] Aug. 27, 1974

[54] BOAT LOADING AND UNLOADING KIT
[76] Inventor: Edward Farris, 16 Coventry, Oroville, Calif. 95965
[22] Filed: Oct. 27, 1972
[21] Appl. No.: 301,375

[52] U.S. Cl. ........................... 214/83.24, 280/414 R
[51] Int. Cl. ............................................. B60p 3/10
[58] Field of Search .......... 214/505, 506, 84, 83.24; 280/414 R

[56] References Cited
UNITED STATES PATENTS

| | | | |
|---|---|---|---|
| 2,763,384 | 9/1956 | Foster | 214/84 |
| 2,860,800 | 11/1958 | Wilson et al. | 214/506 |
| 3,009,589 | 11/1961 | Martz | 214/505 X |
| 3,067,892 | 12/1962 | Barrett et al. | 214/84 X |
| 3,127,042 | 3/1964 | Beckham | 214/505 |
| 3,656,639 | 4/1972 | Lothen | 214/84 |

*Primary Examiner*—Albert J. Makay
*Attorney, Agent, or Firm*—A. J. Castorina

[57] ABSTRACT

A kit comprising a wheeled carriage and rails adapted to be assembled and secured to a boat trailer for facilitating the loading and unloading of a boat therefrom.

7 Claims, 5 Drawing Figures

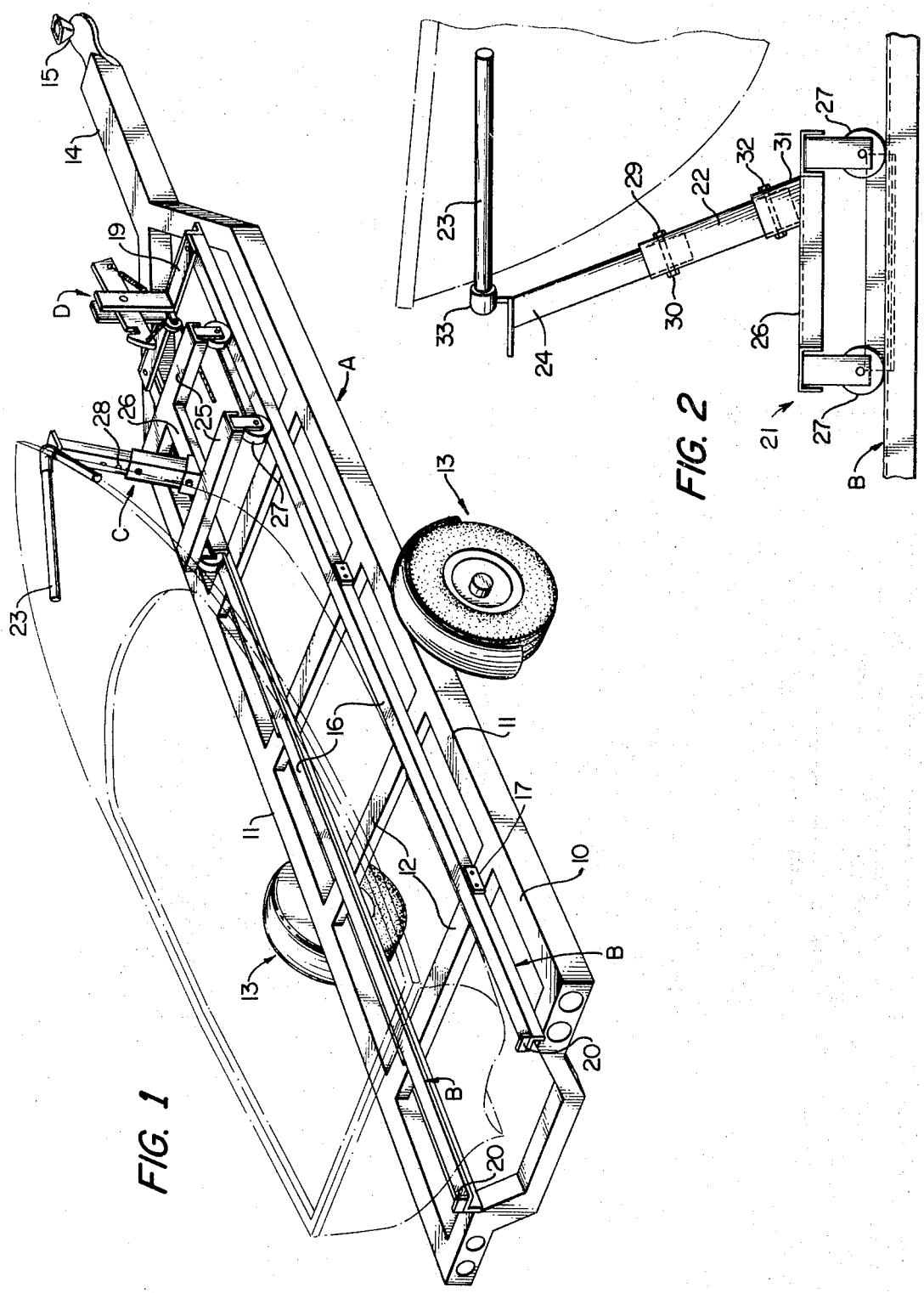

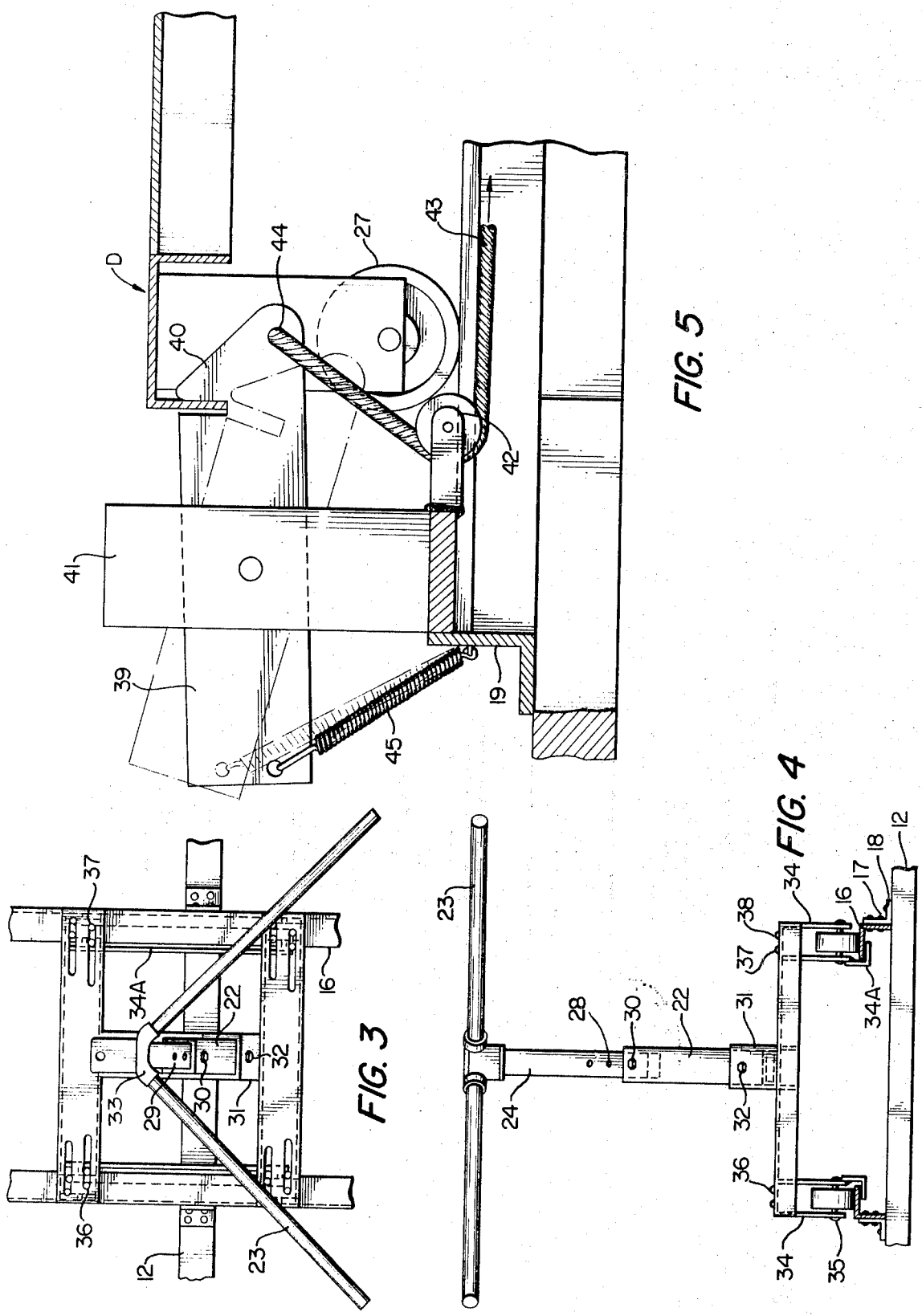

BOAT LOADING AND UNLOADING KIT

BACKGROUND OF THE INVENTION

With the ever increasing popularity of boating, many devices have been developed to facilitate the launching and loading of a boat from a trailer and these devices in the main require extensive modification to the trailers to accomplish the aforesaid objects. Additionally, these devices, relatively speaking, are elaborate and include many parts which add both to the expense and to the time for installing the same.

THE INVENTION

The invention consists of a kit adapted to be used in conjunction with an existing boat trailer which, when assembled, provides rails, a wheeled carriage movably disposed thereover and latch means securing the carriage on the rails for launching and loading a boat therefrom. The rails are comprised of a plurality of sections adapted to be secured end to end and mounted in spaced relation on a trailer bed. The carriage is comprised of a wheeled base having an upright member supporting a pair of arms disposed to form a V and adapted to engage the bow of a boat. The latch means includes a spring biased locking member adapted to be secured to the trailer bed and engageable with the carriage for maintaining the carriage thereon.

SUMMARY OF THE INVENTION

In accordance with the invention disclosed it is therefore an object of the invention to provide a new and improved boat launching and loading means which is easily installed on existing trailers to facilitate the handling of boats.

Another object of this invention is to provide an improved boat handling means for a trailer which is comprised of comparatively few parts which do not require any special tools to assemble.

Another object of the invention is to provide a boat handling means which can be mounted on any existing boat trailer notwithstanding its shape or size.

Another object of the invention is to provide a boat handling means which when installed on the trailer will not necessitate the operator to enter the water to accomplish the launching and loading of the boat.

A further object of the invention is to provide a boat handling means that is simple and economic to manufacture, reliable in operation, sturdy and easy to maintain.

Other objects of the invention will become apparent when taken in conjunction with the drawings.

DESCRIPTION OF THE DRAWINGS

FIG. 1 is a perspective view of a trailer provided with the tracks and carriage of the invention;

FIG. 2 is a side view of the carriage;

FIG. 3 is a top view of the carriage;

FIG. 4 is a rear elevational view of the carriage; and

FIG. 5 is an enlarged view of the latching means associated with the carriage.

DETAILED DESCRIPTION

Referring now to the drawings for a more complete understanding of the invention and more particularly to FIG. 1 thereof, there is shown a typical conventional wheeled trailer A which embodies the structural feature of the present invention comprised of tracks B, B, carriage C, movably positioned thereon, and latch means D associated therewith for maintaining the carriage C in a fixed position on the trailer A.

The rails B, carriage C and latch D are provided in a knockdown condition and are assembled by the user, and as such are capable of being mounted on any trailer notwithstanding the shape and size thereof. With continuing reference to FIG. 1, a typical trailer A is comprised of a base 10 made up of spaced longitudinal rails 11, interconnected by spaced transverse members 12 and supported on wheels 13, 13. The forward ends of the rails 11, 11 merge into a single rail 14 provided with a socket 15 adapted to be removably connected to a towing vehicle in the known fashion.

The rails B are assembled from a plurality of sections 16 connected end to end to one another by brackets 17. As seen in FIG. 4, the rails are L-shape in configuration and while they may be connected to the trailer base in any known fashion are preferably maintained thereon by securing one leg thereof in back to back fashion to one leg of the connecting brackets 17 which are also L-shape in configuration and secured to the transverse members 12 by their other leg by bolts 18. In this manner the ends of the adjoining rail sections 16 are supported on the transverse members 12 to add stability to the same. The rails B, B extend the full length of the trailer and are connected at the forward end thereof by a spacer bar 19 which supports the latching member D as will be explained hereinafter. The rail sections 16 at the rear end of the trailer terminate in upwardly directed flanges 20 for reasons that will become obvious hereinafter.

The carriage C comprises a base designated generally as 21, an upstanding tubular member 22, and a pair of arms 23, 23 disposed in V-shaped fashion supported at their apex 33 by a depending member 24 telescopingly received in the member 22. The arms 23, 23 are adapted to engage the bow of a boat as is shown in phantom in FIG. 1. The base 21 is formed by two spaced support bars 25, 25 connected by a perpendicular bar 26. The bars 25, 25 are provided with wheels 27 at each of their ends rollably supporting the base 21 on the tracks B. The tubular member 22 is disposed at the one end of the bar 26 and receives the depending member 24 of supporting arms 23, 23. A plurality of spaced vertical openings 28, 28 are provided in the member 24, one of which is to be aligned with opening 29 of tubular member 22 and is telescopically maintained therein by a nut and bolt 30 to thereby regulate the height of the arms 23, 23.

As was previously mentioned and as is apparent from FIGS. 2, 3 and 4, the carriage C is designed to be shipped in a collapsed condition and can be easily assembled for use. To this end the tubular member 22 in turn is adapted to be received and maintained in a socket 31 provided on the carriage base 21 by bolt means 32 and the arms 23, 23 are removably received by friction fit or threads, in openings provided in the member 33. Also each wheel 27 is rotatably supported in U-shaped housing 34 by axle 35 with the base of the housing being provided with spaced openings 36 adapted to cooperate with openings 37 provided in the bars 25 for mounting the wheels via nuts and bolts 38 inwards thereof when the dimensions of the trailer necessitate the same. With continuing reference to FIG.

4 it will be seen that each wheel housing is provided with a depending L-shaped lug 34A secured thereto with one leg thereof engaging the underside of rail 16 for maintaining the wheels in engagement therewith.

The kit further includes a latch means D, see FIGS. 1 and 5, comprised of a bar 39 having a hooked nose portion 40 pivotally supported between stanchions 41, 41 adapted to be secured to the rail spacer 19 at the forward end of the trailer. A pulley 42 is mounted at the lower end of the stanchions and a cable 43 is entrained therearound with one end thereof secured in an opening 44 provided in the nose portion 40 and with the other end disposed within easy reach of an occupant in the boat. A spring 45 disposed between the bar 39 and rail spacer 19 biases the bar 39 to a substantially horizontal position, whereby the nose 40 engages a flange of the carriage base for securely maintaining the same thereat.

In use and referring to FIG. 1, when the boat is to be launched, the trailer with the boat is backed into the water at a slight angle whereupon an occupant inside the boat will pull on the cable 43 to move the latch 40 against the bias of the spring 45 to release the carriage with the arms 23, 23 thereof engaging the bow of the boat to move it rearwardly into the water at the end of the trailer. As the carriage rolls toward the end of the trailer the upturned flanges 20 engage the wheels of the carriage to stop its motion and maintain the same on the trailer. To load the boat, and with the trailer in the water, it is only necessary to steer the bow thereof into engagement with the arms 23, 23 of the carriage which is positioned at the rear of the boat, reduce the engine power and drive the boat onto the trailer causing the carriage to move to the front thereof, whereby the carriage flange will ride up the nose portion 40 and drop therebehind to lock the carriage in place under the influence of the spring. The power can then be terminated and the trailer can be towed out of the water. The boat can then be additionally secured to the trailer in the known manner.

I claim:

1. A boat loading and unloading kit including a boat engaging carriage, rails, and latch means for an existing boat trailer wherein each of the rails are adapted to be disposed longitudinally of the trailer and are comprised of a plurality of sections disposed in end to end relationship from the front to the rear of the boat, latch means adapted to be connected to the trailer and including biased locking means, a carriage including a base having wheels positioned on said rails, means removably and adjustably securing the wheels of the carriage to the base, and including lugs adapted to engage each of the rails for maintaining the carriage thereon, an upright member comprised of a plurality of interengaging parts capable of being disassembled and being disposed on said base and supporting angularly disposed arms at the upper end thereof adapted to engage the bow of a boat and guide its movement, and defining a portion thereon adapted to engage the locking means for holding the carriage thereon.

2. The invention of claim 1 wherein the parts include means for adjusting and maintaining one relative to the other so thereby vary the height of the arms with respect to the base.

3. The invention of claim 1 wherein the latch means includes a latch bar, at least one stanchion, means pivotally securing the bar to the stanchion and biasing means secured to the bar for maintaining the same in a position for engaging a portion of the carriage base.

4. The invention of claim 3 wherein a cable engaging means are secured to the latch means and a cable is entrained thereof for urging the same against the bias of the spring for releasing the carriage.

5. The invention of claim 1 wherein bracket means are provided for securing the ends of the rail sections to one another.

6. The invention of claim 1 wherein the wheel adjustable securing means is comprised of a U-shaped housing with the wheel rotatably disposed between the open end thereof.

7. The invention of claim 1 wherein the end portions of the rail sections adapted to be disposed at the end of the trailer extends upwardly to constrain the carriage on the rails.

* * * * *